(12) United States Patent
Park

(10) Patent No.: US 10,394,406 B2
(45) Date of Patent: Aug. 27, 2019

(54) TOUCH DISPLAY DEVICE

(71) Applicant: Boe Technology Group Co., Ltd., Beijing (CN)

(72) Inventor: Hanjun Park, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/566,206

(22) PCT Filed: May 2, 2017

(86) PCT No.: PCT/CN2017/082720
§ 371 (c)(1),
(2) Date: Oct. 12, 2017

(87) PCT Pub. No.: WO2017/202180
PCT Pub. Date: Nov. 30, 2017

(65) Prior Publication Data
US 2018/0267651 A1    Sep. 20, 2018

(30) Foreign Application Priority Data
May 23, 2016 (CN) .......................... 2016 1 0344702

(51) Int. Cl.
G06F 3/047    (2006.01)
G06F 3/01     (2006.01)
(Continued)

(52) U.S. Cl.
CPC .............. *G06F 3/047* (2013.01); *G06F 3/017* (2013.01); *G06F 3/0412* (2013.01);
(Continued)

(58) Field of Classification Search
CPC ........ G06F 3/047; G06F 3/017; G06F 3/0412; G06F 3/0416; G06F 3/042; G06F 3/0421;
(Continued)

(56) References Cited

U.S. PATENT DOCUMENTS 8,773,352 B1 * 7/2014 Huang ................... G09G 5/00
345/156
2005/0134751 A1 * 6/2005 Abileah .............. G02F 1/13338
349/42
(Continued)

FOREIGN PATENT DOCUMENTS

CN    103558949 A    2/2014
CN    203465697 U    3/2014
(Continued)

OTHER PUBLICATIONS

Office Action received for Chinese Patent Application No. 201610344702.0, dated May 4, 2018, 17 pages (9 pages of English Translation and 8 pages of Office Action).
(Continued)

*Primary Examiner* — Tom V Sheng
(74) *Attorney, Agent, or Firm* — Womble Bond Dickinson (US) LLP

(57) ABSTRACT

Disclosed is a touch display device including a display panel, an infrared emission array, and a plurality of infrared sensing units. The display panel includes a border area and a display area which includes a plurality of sub-pixels each including an aperture region. The infrared emission array is disposed in the border area and includes a plurality of infrared light emitters configured to emit infrared light covering the display area. Each of the plurality of infrared sensing units includes an infrared sensor disposed in the aperture region of a respective one of the plurality of sub-pixels.

18 Claims, 3 Drawing Sheets

(51) Int. Cl.
*G06F 3/041* (2006.01)
*G06F 3/042* (2006.01)
(52) U.S. Cl.
CPC .......... *G06F 3/0416* (2013.01); *G06F 3/0421* (2013.01); *G02F 2201/121* (2013.01)
(58) Field of Classification Search
CPC .... G06F 3/0423; G06F 3/0304; G06F 3/0308; G02F 2201/121; G02F 1/13338
See application file for complete search history.

(56) References Cited

U.S. PATENT DOCUMENTS

| | | | | |
|---|---|---|---|---|
| 2009/0135167 A1* | 5/2009 | Sakai | G02F 1/13318 | 345/207 |
| 2010/0090965 A1* | 4/2010 | Birkler | G06F 3/0412 | 345/173 |
| 2011/0043487 A1* | 2/2011 | Huang | G06F 3/0412 | 345/175 |
| 2011/0102392 A1* | 5/2011 | Fujioka | G02F 1/13338 | 345/207 |
| 2011/0175830 A1* | 7/2011 | Miyazawa | G06F 1/1643 | 345/173 |
| 2011/0205209 A1* | 8/2011 | Kurokawa | G01J 1/18 | 345/211 |
| 2012/0086647 A1* | 4/2012 | Birkler | G06F 1/3203 | 345/173 |
| 2013/0229401 A1* | 9/2013 | Kim | G09G 3/3648 | 345/212 |
| 2013/0314377 A1* | 11/2013 | Los | G06F 3/0308 | 345/175 |
| 2014/0166853 A1* | 6/2014 | Chuang | G06F 3/0304 | 250/206.1 |
| 2014/0192023 A1 | 7/2014 | Hoffman | | |
| 2014/0354597 A1* | 12/2014 | Kitchens, II | G06F 1/3215 | 345/175 |
| 2015/0015543 A1 | 1/2015 | Hsieh | | |
| 2015/0130708 A1* | 5/2015 | Kang | G06F 3/0304 | 345/156 |
| 2015/0242056 A1* | 8/2015 | Hoffman | G06F 3/0428 | 345/175 |
| 2015/0331508 A1* | 11/2015 | Nho | G06F 3/0421 | 345/173 |
| 2015/0364107 A1* | 12/2015 | Sakariya | G06F 3/0412 | 345/174 |
| 2016/0117013 A1* | 4/2016 | Xiao | G06F 3/0421 | 345/174 |
| 2016/0210452 A1* | 7/2016 | Pahud | G06F 21/32 | |
| 2017/0115823 A1 | 4/2017 | Huang et al. | | |
| 2017/0123542 A1* | 5/2017 | Xie | H01L 21/77 | |
| 2017/0131790 A1* | 5/2017 | Sung | G06F 3/0304 | |

FOREIGN PATENT DOCUMENTS

| | | |
|---|---|---|
| CN | 104299520 A | 1/2015 |
| CN | 104991685 A | 10/2015 |
| CN | 105224138 A | 1/2016 |
| CN | 106055174 A | 10/2016 |
| CN | 205692146 U | 11/2016 |

OTHER PUBLICATIONS

International Search Report and Written Opinion in PCT/CN2017/082720 dated Aug. 9, 2017, with English translation.

* cited by examiner

TOUCH DISPLAY DEVICE

CROSS-REFERENCE TO RELATED APPLICATIONS

The present application is the U.S. national phase entry of PCT/CN2017/082720, with an international filing date of May 2, 2017, which claims the benefit of Chinese Patent Application No. 201610344702.0, filed on May 23, 2016, the entire disclosures of which are incorporated herein by reference.

TECHNICAL FIELD

The present disclosure relates to the field of touch control technology, and particularly to a touch display device.

BACKGROUND

At present, it is generally necessary to use a CCD/CMOS camera to acquire and recognize a user's action (e.g., a gesture) in a conventional touch display device. Moreover, motion sensors may have been needed to analyze the user's actions at night or in dark scenarios. CCD/CMOS cameras and motion sensors may however be expensive and integrating them into display devices is not easy.

SUMMARY

Embodiments of the present disclosure provide an alternative touch display device for recognizing a user's touch action.

According to an aspect of the present disclosure, a touch display device is provided comprising a display panel including a display area and a border area other than the display area. The display area comprises a plurality of gate lines extending in a first direction, a plurality of data lines intersecting the gate lines, a plurality of signal read lines intersecting the gate lines, and a plurality of sub-pixels disposed at intersections of the gate lines and the data lines, each of the sub-pixels including an aperture region. The touch display device further comprises: an infrared emission array disposed in the border area and comprising a plurality of infrared light emitters configured to emit infrared light covering the display region; and a plurality of infrared sensing units each comprising an infrared sensor disposed in the aperture region of a respective one of the plurality of sub-pixels, the infrared sensor being configured to generate a response signal upon irradiation by the infrared light and transmit the response signal to one of the signal read lines for detection.

In some embodiments, the infrared sensor is a quantum dot infrared sensor having quantum dots.

In some embodiments, the quantum dot infrared sensor is configured such that the quantum dots emit light having a same color as the respective sub-pixel upon irradiation by the infrared light.

In some embodiments, the infrared sensor has a first electrode and a second electrode, and each of the infrared sensing units further comprises a first switch unit operable to couple a reference voltage to the first electrode of the infrared sensor and a second switch unit operable to couple the second electrode of the infrared sensor to one of the signal read lines.

In some embodiments, the first switch unit has a control terminal connected to a first one of the plurality of gate lines to which the sub-pixel where the infrared sensor is disposed is connected, and the second switch unit has a control terminal connected to a second one of the plurality of gate lines, the second gate line being next to the first gate line.

In some embodiments, each of the first and second switch units has a control terminal connected to one of the plurality of gate lines to which the sub-pixel where the infrared sensor is disposed is connected.

In some embodiments, each of the sub-pixels comprises an electroluminescent element having an anode and a cathode, the infrared sensor is a quantum dot infrared sensor, and one of the first and second electrodes of the quantum dot infrared sensor is formed in a same layer as the anode, while the other of the first and second electrodes of the quantum dot infrared sensor is formed in a same layer as the cathode.

In some embodiments, the touch display device further comprises a plurality of condensing lenses each provided opposite to a photosensitive surface of a respective one of the infrared sensors for converging infrared light reflected by an object performing a touch operation to the condensing lens to the photosensitive surface of the respective infrared sensor.

In some embodiments, the signal read lines extend in a same direction as the data lines.

In some embodiments, the plurality of infrared light emitters are quantum dot infrared emitters.

In some embodiments, the plurality of infrared light emitters are distributed at least at opposite sides of the display area in the border area.

In some embodiments, the touch display device further comprises one or more optical lenses provided in a light exit direction of the infrared emission array for directing the infrared light emitted by the infrared emission array to the display area.

These and other aspects of the present disclosure will be apparent from and elucidated with reference to the embodiment(s) described hereinafter.

DETAILED DESCRIPTION

Figure 1:
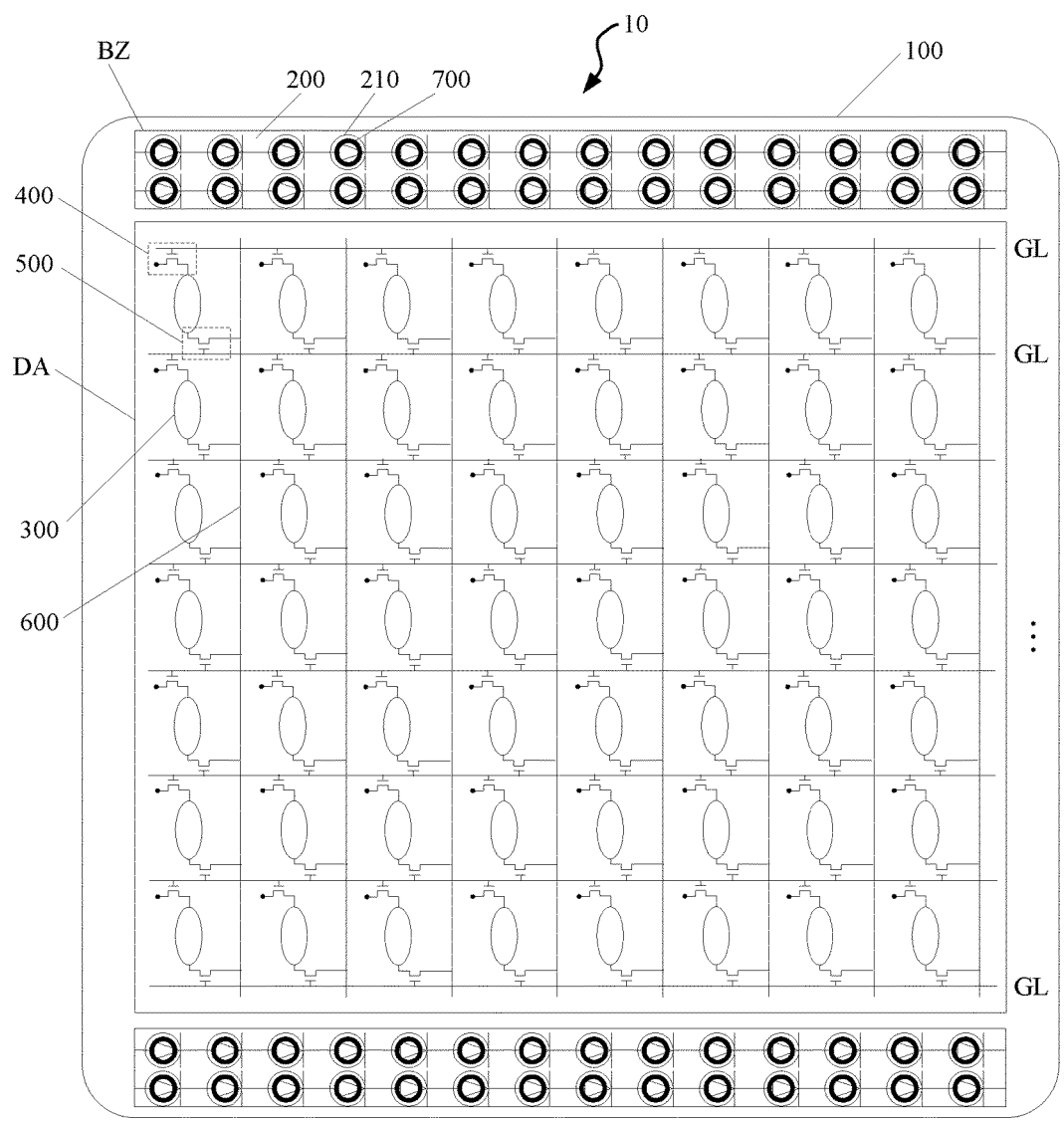
FIG. 1 is a schematic structural diagram of a touch display device according to an embodiment of the present disclosure.

Embodiments of the present disclosure will be described below in detail with reference to the accompanying drawings.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. Terms such as "before" or "preceding" and "after" or "followed by" may be similarly used, for example, to indicate an order in which light passes through the elements. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. In no event, however, should "on" or "directly on" be construed as requiring a layer to completely cover an underlying layer.

Embodiments of the disclosure are described herein with reference to schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a schematic structural diagram of a touch display device 10 according to an embodiment of the present disclosure. As shown in FIG. 1, the touch display device 10 includes a display panel 100, an infrared emission array 200, and a plurality of infrared sensing units.

The display panel 100 includes a display area DA and a border area BZ other than the display area DA. The display area DA includes a plurality of gate lines GL extending in a first direction, a plurality of data lines (not shown in FIG. 1) intersecting the gate lines GL, a plurality of signal read lines 600 intersecting the gate lines GL, and a plurality of sub-pixels (not shown in FIG. 1) disposed at the intersections of the gate lines GL and the data lines. Each of the sub-pixels includes an aperture region. As is known, the term aperture region is intended to refer to a light-transmissive portion of a sub-pixel, which may be considered as an effective display area of the sub-pixel.

The infrared emission array 200 is disposed in the border region BZ and includes a plurality of infrared light emitters 210. The plurality of infrared light emitters 210 may emit infrared light that covers the display area DA. For example, the plurality of infrared light emitters 210 may emit an array of infrared light beams oriented toward above the display area DA. Examples of the infrared light emitters 210 include, but are not limited to, quantum dot infrared emitters. The number and distribution of the infrared light emitters 210 shown in FIG. 1 is exemplary.

Each of the plurality of infrared sensing units includes an infrared sensor 300 disposed in the aperture region of a respective one of the plurality of sub-pixels. The infrared sensor 300 is provided in the aperture region of the sub-pixel so that it can respond to ambient infrared light (e.g., from the infrared emission array 200). The infrared sensor 300 may generate a response signal when irradiated by the infrared light and transmit the response signal to one of the signal read lines 600 for detection. Examples of the infrared sensors 300 include, but are not limited to, quantum dot infrared sensors, such as quantum dot infrared photodetectors (QDIPs). It will be appreciated that in the touch display device 10, the number of the infrared sensors 300 may depend on the desired touch detection accuracy. In some embodiments, each of the sub-pixels of the display panel 100 is provided with a respective infrared sensor 300. In some embodiments, only a portion of the sub-pixels of the display panel 100 are provided with an infrared sensor 300.

Each of the infrared sensing units further includes a first switch unit 400 operable to couple a reference voltage (not shown) to a first electrode of the infrared sensor 300 and a second switch unit 500 operable to couple a second electrode of the infrared sensor 300 to one of the signal read lines 600. Examples of the first switch unit 400 and the second switch unit 500 include, but are not limited to, transistors.

In operation, the infrared emission array 200 may emit an array of infrared rays over the display area DA of the display panel 100. As a touch object contacts or approaches the display area DA at a certain position, the infrared rays irradiated at that position in the array of infrared rays are blocked and reflected by the touch object, and then received by a corresponding infrared sensor 300 in the display area DA. The touch position of the touch object can be determined based on the response signals of the infrared sensors 300. The term touch position is not intended to require that the touch object should be in contact with the display panel 100. For example, the touch object may be suspended over the display panel 100.

In some embodiments, as shown in FIG. 1, the plurality of infrared emitters 210 of the infrared emitting array 200 are distributed at opposite sides of the display area DA in the border region BZ. This facilitates a uniform distribution of the infrared light emitted by the infrared emission array 200 over the display area DA. In other embodiments, the plurality of infrared emitters 210 may also be distributed at more or less sides of the display area DA.

In some embodiments, the touch display device 10 further includes one or more optical lenses 700 that are disposed in a light exit direction of the infrared emission array 200. The one or more optical lenses 700 may direct the infrared light emitted by the infrared emission array 200 to the display area DA. This may improve the utilization efficiency of infrared light. In the example of FIG. 1, a respective optical lens 700 is provided in the light exit direction of each infrared emitter 210, although this is not necessary.

Advantageously, the touch display device 10 may perform the recognition of a touch action both at night and during the day without being affected by the lighting conditions. In addition, the infrared sensor 300 may have a lower cost than a CCD/CMOS sensor or a motion sensor. Examples of the touch display device 10 include any product or component having display functionality, such as a mobile phone, a tablet computer, a television set, a monitor, a notebook computer, a digital photo frame, a navigator, and the like.

Figure 2A:
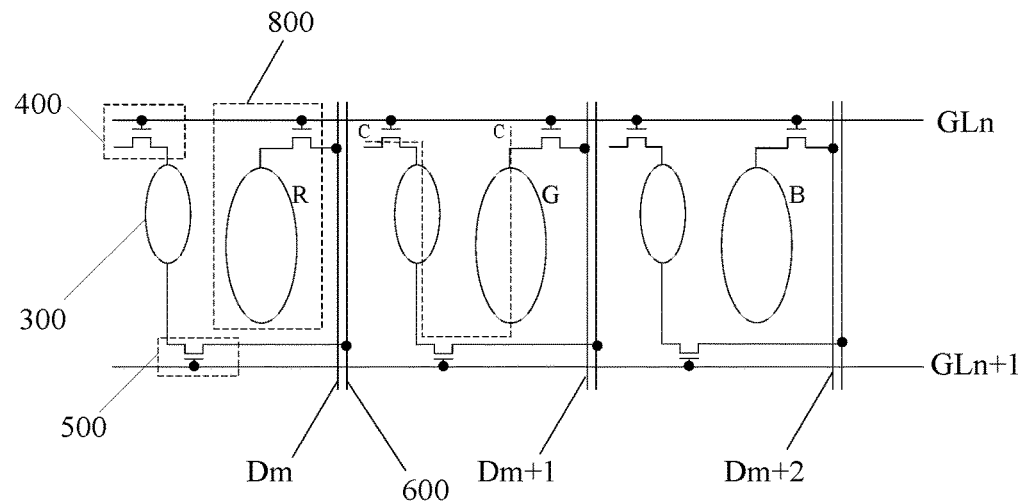
FIG. 2A is a schematic diagram of a partial configuration of the touch display device of FIG. 1.

FIG. 2A is a schematic diagram of a partial configuration of the touch display device 10 of FIG. 1. As shown in FIG. 2A, three sub-pixels 800 (illustrated as R, G, and B for red, green, and blue, respectively) are provided at the intersections of the gate line GLn and the data lines Dm, Dm+1, Dm+2. Each of the three sub-pixels R, G, and B is provided with a respective infrared sensing unit which includes a infrared sensor 300, a first switch unit 400, and a second switch unit 500.

The first switch unit 400 has a control terminal connected to a first gate line GLn to which the sub-pixels R, G, and B are connected. The second switch unit 500 has a control terminal connected to a second gate line GLn+1. The second gate line GLn+1 is next to the first gate line GL, as shown in FIG. 2A. The signal reading lines 600 may extend in the same direction as the respective data lines Dm, Dm+1, Dm+2. For example, the signal reading lines 600 and the data lines Dm, Dm+1, Dm+2 are substantially perpendicular to the gate lines GLn, GLn+1.

In the case of the quantum dot infrared sensor 300, when a gate-on signal is applied to the gate line GLn, the first switch unit 400 is turned on and the reference voltage is coupled to the first electrode of the quantum dot infrared sensor 300 so that the quantum dot infrared sensor 300 is reset. Then, the gate-on signal is applied to the gate line GLn+1, the first switch unit 400 is turned off, and the second switch unit 500 is turned on. At this time, if the quantum dot infrared sensor 300 receives the infrared ray, it generates and outputs a response signal (photocurrent) to the signal read line 600. The response signal is transmitted via the signal read line 600 to an external circuit for detection. As the gate-on signal is sequentially applied to the respective gate lines GL of the display panel 100, the above process is repeated. The touch position of the touch object on the display area DA of the display panel 100 can be determined based on the detection of the response signals transmitted from the signal reading lines 600. In addition, the position (depth) of the touch object in a direction perpendicular to the display panel 100 can be inferred from a magnitude of the response signal. The touch position and depth can be used to identify an action of the touch object in the three-dimensional space.

In some embodiments, the quantum dot infrared sensor 300 may be configured such that when irradiated by the infrared light its quantum dots emit light that has the same color as the sub-pixel where the quantum dot infrared sensor 300 is disposed. In the example of FIG. 2A, the leftmost quantum dot infrared sensor 300 can emit red light when irradiated by the infrared light, and the intermediate quantum dot infrared sensor 300 can emit green light when irradiated by the infrared light, and the rightmost quantum dot infrared sensor 300 can emit blue light when irradiated by the infrared light. This may compensate for the loss of the aperture rate of the sub-pixel due to the provision of the quantum dot infrared sensor 300 in the aperture region of the sub-pixel.

Figure 2B:
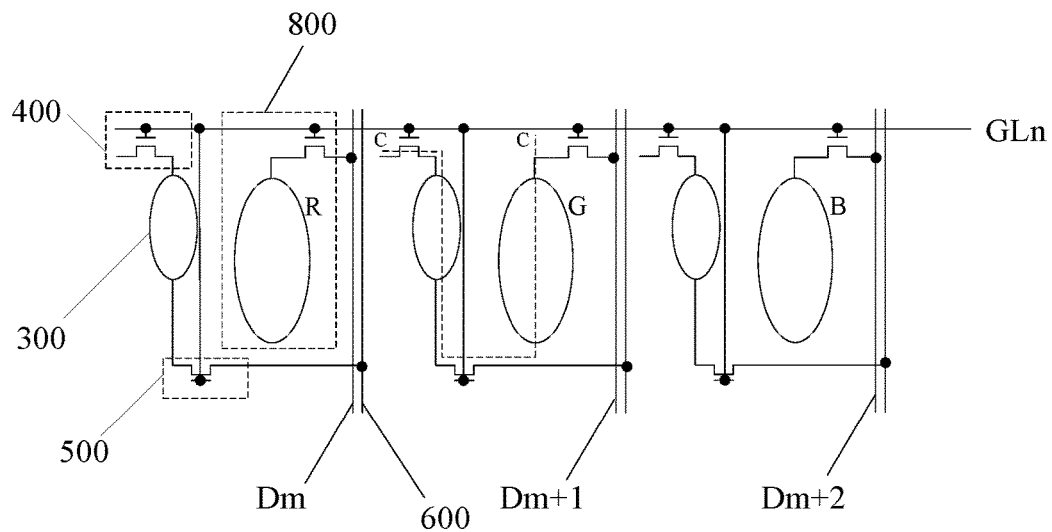
FIG. 2B is a schematic diagram of a variation of the partial configuration of the touch display device of FIG. 1.

FIG. 2B is a schematic diagram of a variation of the partial configuration of the touch display device 10 of FIG. 1. In this example, the first switch unit 400 and the second switch unit 500 each have a control terminal connected to the gate line GLn to which the sub-pixels R, G, and B are connected.

In the case of the quantum dot infrared sensor 300, when the gate enable signal is applied to the gate line GLn, the first switch unit 400 is turned on and the reference voltage is coupled to the first electrode of the quantum dot infrared sensor 300. The second switch unit 500 is also turned on under the control of the gate-on signal. At this time, if the quantum dot infrared sensor 300 receives the infrared ray, it generates and outputs a response signal (photocurrent) to the signal reading line 600. The response signal is transmitted via the signal read line 600 to an external circuit for detection. As the gate-on signal is sequentially applied to the respective gate lines GL of the display panel 100, the above process is repeated. In the embodiment of FIG. 2B, each detection process is performed in one horizontal scanning cycle as compared to the embodiment described above with respect to FIG. 2A.

Figure 3:
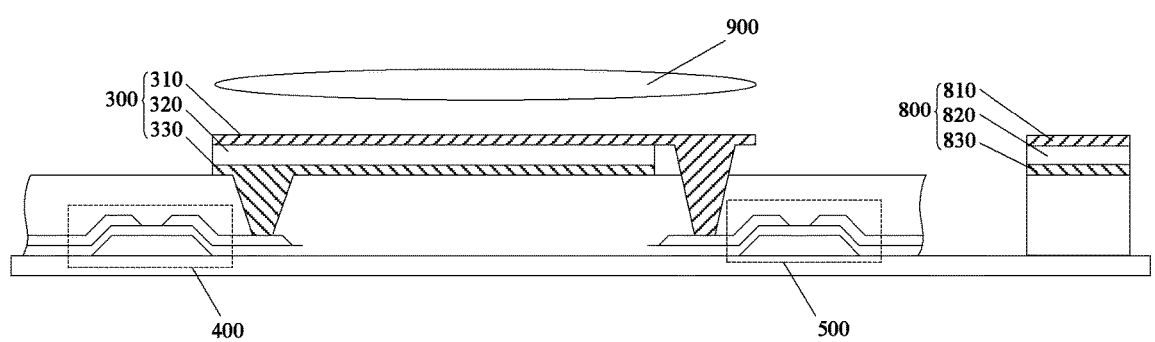
FIG. 3 is a schematic cross-sectional view taken along line C-C of FIGS. 2A and 2B.

FIG. 3 is a schematic cross-sectional view taken along line C-C of FIGS. 2A and 2B, in which a first switch unit 400 as a transistor, an infrared sensor 300 as a quantum dot infrared sensor, a second switch unit 500 as a transistor, and a layered structure of a portion of the sub-pixel 800 are schematically shown.

The quantum dot infrared sensor 300 includes a first electrode 330 coupled to a reference voltage (not shown) through the first switch unit 400, a second electrode 310 coupled to a signal read line (not shown) via the second switch unit 500, and a quantum dot infrared sensing layer 320 sandwiched between the first electrode 330 and the second electrode 310. When irradiated by the infrared light, the quantum dot infrared sensing layer 320 may, in response, generate a photocurrent with the driving by a voltage applied across the first electrode 330 and the second electrode 310.

Depending on the type of the display panel, the sub-pixel 800 may be a liquid crystal display sub-pixel or an electroluminescent display sub-pixel. In the case of the liquid crystal display sub-pixel, as known, the sub-pixel 800 may include a pixel electrode and a common electrode. In some embodiments, the first electrode 330 of the quantum dot infrared sensor 300 is coupled to the common electrode (not shown) through a first switch unit 400, and a common voltage applied to the common electrode serves as the reference voltage for the quantum dot infrared sensor 300. In the case of the electroluminescent display sub-pixel, as shown in FIG. 3, the sub-pixel 800 includes an anode 830, a cathode 810, and a light-emitting layer 820 sandwiched between the anode 830 and the cathode 810. In some embodiments, the second electrode 310 of the quantum dot infrared sensor 300 is disposed in the same layer as the cathode 810 of the sub-pixel 800, and the first electrode 330 of the quantum dot infrared sensor 300 is disposed in the same layer as the anode 830 of the sub-pixel 800. Other embodiments are possible. For example, the first electrode 330 of the quantum dot infrared sensor 300 is disposed in the same layer as the cathode 810 of the sub-pixel 800, and the second electrode 310 of the quantum dot infrared sensor 300 is disposed in the same layer as the anode 830 of the sub-pixel 800. This facilitates integration of the quantum dot infrared sensors with the sub-pixels.

In some embodiments, the touch display device 10 further includes a plurality of condenser lenses 900. As shown in FIG. 3, each of the condenser lenses 900 is provided opposite to a photosensitive surface of a respective one of the infrared sensors 300 for converging the infrared light reflected from the touch object to the condenser lens 900 to the photosensitive surface of the respective infrared sensor 300. This may increase the intensity of the infrared rays irradiated to the infrared sensor 300, thereby improving the sensitivity of touch detection.

It will be apparent to those skilled in the art that various modifications and variations can be made to this disclosure without departing from the spirit and scope of the present disclosure. Thus, such modifications and variations are intended to be encompassed in the present disclosure if these modifications and variations fall within the scope of the appended claims and equivalents thereof.

What is claimed is:

1. A touch display device, comprising:
    a display panel including a display area and a border area other than the display area, the display area comprising:
        a plurality of gate lines extending in a first direction;
        a plurality of data lines intersecting the gate lines;
        a plurality of signal read lines intersecting the gate lines; and
        a plurality of sub-pixels disposed at intersections of the gate lines and the data lines, each of the sub-pixels including an aperture region;
    an infrared emission array disposed in the border area and comprising a plurality of infrared light emitters configured to emit infrared light covering the display region; and
    a plurality of infrared sensing units each comprising an infrared sensor disposed in the aperture region of a respective one of the plurality of sub-pixels, the infrared sensor being configured to generate a response signal upon irradiation by the infrared light and transmit the response signal to one of the signal read lines for detection,
    wherein the infrared sensor has a first electrode and a second electrode, and
    wherein each of the infrared sensing units further comprises a first switch unit operable to couple a reference voltage to the first electrode of the infrared sensor and a second switch unit operable to couple the second electrode of the infrared sensor to one of the signal read lines.

2. The touch display device of claim 1, wherein the infrared sensor is a quantum dot infrared sensor having quantum dots.

3. The touch display device of claim 2, wherein the quantum dot infrared sensor is configured such that the quantum dots emit light having a same color as the respective sub-pixel upon irradiation by the infrared light.

4. The touch display device of claim 3, further comprising one or more optical lenses provided in a light exit direction of the infrared emission array for directing the infrared light emitted by the infrared emission array to the display area.

5. The touch display device of claim 2, further comprising one or more optical lenses provided in a light exit direction of the infrared emission array for directing the infrared light emitted by the infrared emission array to the display area.

6. The touch display device of claim 2, wherein the plurality of infrared light emitters are distributed at least at opposite sides of the display area in the border area.

7. The touch display device of claim 1, wherein the first switch unit has a control terminal connected to a first one of the plurality of gate lines to which the sub-pixel where the infrared sensor is disposed is connected, and wherein the second switch unit has a control terminal connected to a second one of the plurality of gate lines, the second gate line being next to the first gate line.

8. The touch display device of claim 7, further comprising one or more optical lenses provided in a light exit direction of the infrared emission array for directing the infrared light emitted by the infrared emission array to the display area.

9. The touch display device of claim 1, wherein each of the first and second switch units has a control terminal connected to one of the plurality of gate lines to which the sub-pixel where the infrared sensor is disposed is connected.

10. The touch display device of claim 9, further comprising one or more optical lenses provided in a light exit direction of the infrared emission array for directing the infrared light emitted by the infrared emission array to the display area.

11. The touch display device of claim 1, wherein each of the sub-pixels comprises an electroluminescent element having an anode and a cathode, wherein the infrared sensor is a quantum dot infrared sensor, and wherein one of the first and second electrodes of the quantum dot infrared sensor is formed in a same layer as the anode, and the other of the first and second electrodes of the quantum dot infrared sensor is formed in a same layer as the cathode.

12. The touch display device of claim 11, further comprising one or more optical lenses provided in a light exit direction of the infrared emission array for directing the infrared light emitted by the infrared emission array to the display area.

13. The touch display device of claim 1, further comprising a plurality of condensing lenses each provided opposite to a photosensitive surface of a respective one of the infrared sensors for converging infrared light reflected by an object performing a touch operation to the condensing lens to the photosensitive surface of the respective infrared sensor.

14. The touch display device of claim 13, further comprising one or more optical lenses provided in a light exit direction of the infrared emission array for directing the infrared light emitted by the infrared emission array to the display area.

15. The touch display device of claim 1, wherein the signal read lines extend in a same direction as the data lines.

16. The touch display device of claim 1, wherein the plurality of infrared light emitters are quantum dot infrared emitters.

17. The touch display device of claim 1, wherein the plurality of infrared light emitters are distributed at least at opposite sides of the display area in the border area.

18. The touch display device of claim 1, further comprising one or more optical lenses provided in a light exit direction of the infrared emission array for directing the infrared light emitted by the infrared emission array to the display area.

* * * * *